(12) United States Patent
Von Gentzkow et al.

(10) Patent No.: US 6,201,074 B1
(45) Date of Patent: Mar. 13, 2001

(54) MIXTURE OF EPOXY RESIN, EPOXIDE GROUP-CONTAINING P COMPOUND, P-MODIFIED EPOXY RESIN AND POLYAMINE

(75) Inventors: Wolfgang Von Gentzkow, Kleinsendelbach; Dieter Heinl, Erlangen; Heinrich Kapitza, Fürth; Michael Schreyer, Weisendorf, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/269,543

(22) PCT Filed: Sep. 10, 1997

(86) PCT No.: PCT/DE97/02019

§ 371 Date: Jul. 1, 1999

§ 102(e) Date: Jul. 1, 1999

(87) PCT Pub. No.: WO98/13407

PCT Pub. Date: Apr. 2, 1998

(30) Foreign Application Priority Data

Sep. 26, 1996 (DE) .............................................. 196 39 720

(51) Int. Cl.⁷ .......................... B32B 17/04; B32B 27/04; C08K 3/36; C08L 63/02; C08L 63/04
(52) U.S. Cl. ...................... 525/525; 428/297.4; 428/413; 523/428
(58) Field of Search .................. 525/525; 428/297.4, 428/413; 523/428

(56) References Cited

U.S. PATENT DOCUMENTS

| | | |
|---|---|---|
| 2,766,139 | 10/1956 | Green et al. . |
| 2,856,369 | 10/1958 | Smith et al. . |
| 3,398,019 | 8/1968 | Langguth et al. .................... 117/138 |
| 5,364,893 | 11/1994 | von Gentzkow et al. ............ 523/429 |
| 5,376,453 | 12/1994 | von Gentzkow et al. ............ 523/429 |
| 5,576,357 | 11/1996 | Bayer et al. .......................... 522/170 |

FOREIGN PATENT DOCUMENTS

| | | |
|---|---|---|
| 25 38 675 | 3/1977 | (DE) . |
| 42 37 132 | 7/1994 | (DE) . |
| 43 40 834 | 9/1994 | (DE) . |
| 195 06 010 | 8/1996 | (DE) . |
| 0 243 201 | 10/1987 | (EP) . |
| 0 384 940 | 3/1989 | (EP) . |
| 0 384 939 | 9/1990 | (EP) . |
| 51-143620 | 12/1976 | (JP) . |
| WO 94/21703 | 9/1994 | (WO) . |
| WO 94/21704 | 9/1994 | (WO) . |
| WO 94/21706 | 9/1994 | (WO) . |
| WO 96/07678 | 3/1996 | (WO) . |
| WO 96/07684 | 3/1996 | (WO) . |
| WO 96/07685 | 3/1996 | (WO) . |
| WO 96/07686 | 3/1996 | (WO) . |
| WO 96/23018 | 8/1996 | (WO) . |

OTHER PUBLICATIONS

Bonsignore, P., "A new flame–retardanet microfiber reinforcement for thermoplastics," *Plastics Engineering*, Oct. 1976, pp. 41–43.

Woods, W. et al., "A new heat–stable zinc borate fire retardant," *Modern Plastics*, vol. 47, Jun. 1970, pp. 140–150.

Kuryla, W. et al., "Flame Retardancy of Polymeric Materials," *Marcel Dekker, Inc.*, New York, vol. 1 (1973), pp. 24–61.

Pitts, J., "Antimony—Halogen Synergistic Reactions in Fire Retardants," *J. Fire and Flammability*, vol. 3 (1972), pp. 51–83.

Zh. Obshch. Khim. Bd. 54, Heft 10 (1984), pp. 2404–2405.

*Primary Examiner*—Robert E. L. Sellers
(74) *Attorney, Agent, or Firm*—Kenyon & Kenyon

(57) ABSTRACT

Epoxy resin mixtures suitable for producing halogen-free flame-retardant composites by the injection process comprise the following components:

(A) a phosphorus-free aliphatic and/or aromatic and/or heterocyclic epoxy resin;

(B) an epoxide group-containing phosphorus compound;

(C) a phosphorus-modified epoxy resin with an epoxide value of from 0.02 to 1 mol/100 g, obtained by reacting polyepoxy compounds having at least two epoxide groups per molecule with phosphinic anhydrides and/or phosphonic anhydrides or with phosphonic monoesters, followed by thermal elimination of alcohol; and (D) as hardener, at least one primary or secondary aliphatic polyamine with NH and/or $NH_2$ groups.

12 Claims, No Drawings

MIXTURE OF EPOXY RESIN, EPOXIDE GROUP-CONTAINING P COMPOUND, P-MODIFIED EPOXY RESIN AND POLYAMINE

BACKGROUND OF THE INVENTION

The invention relates to epoxy resin mixtures for producing composites by the injection process.

Composites based on epoxy resins and on inorganic or organic reinforcing materials have achieved great importance in many areas of engineering and of daily life. The reasons for this are on the one hand the relatively simple and reliable processing of the epoxy resins and on the other hand the high level of mechanical and chemical properties of the cured epoxy resin materials, which permits adaptation to different applications and advantageous utilization of the properties of all of the materials involved in the composite.

Especially in the production of small numbers of large-surface-area parts, as used for lightweight construction of aircraft, ships and vehicles, and also in the form of materials used for housings, insulation or construction in the electrical and building industries, care has to be taken that shaping processes are simple and cost-effective. Injection or RTM technology has proven successful here (RTM=resin transfer molding), permitting economic operation and giving smooth internal and external surfaces. In this process, epoxy resin mixtures are injected into a mold previously provided, if necessary, with the required inorganic and/or organic reinforcing materials. Reinforcing materials which can be used here are glass fibers, carbon fibers, aramid fibers and/or other reinforcing fibers, the selection of the fiber material depending on the mechanical requirements placed upon the products. Wood and natural fibers can also be suitable. For lightweight construction in particular, use may also be made of foams, such as polyurethane foams or PVC foams.

Injection technology is particularly advantageous when the epoxy resins used can be processed at room temperature and cured at low temperatures without applying pressure. In this case cost-effective polymer molds can be used. However, the resin formulations required have to have very low viscosity and have good flow performance and wetting performance with respect to the reinforcing materials, and develop a good bond to these. In addition, they have to cure without application of pressure and, after release from the mold and, if desired, postcuring, must have excellent mechanical properties.

Another requirement which has achieved increasing importance in recent times is that for low combustibility. In many areas this requirement is given first priority because of the danger posed to life and property, for example in materials used for the construction of aircraft, ships, motor vehicles or rail vehicles, in particular if the vehicles are used as a means of public transport.

The cured resins have to pass various tests to assess the combustion performance of the materials. For electronic products, for example, the UL 94 V combustion test is required, predominantly with V-0 classification. For polymers in rail vehicle construction, the combustion test of DIN 5510 has to be carried out. Here, for example, S4 classification requires that, after flame application for 3 minutes, the material becomes extinguished within a few seconds, the diameter of the flame-damaged area is less than 20 cm, the material does not form drops and the integral smoke gas density causes light scattering of less than 50%. For construction materials, the specifications in DIN 4102 apply.

However, these requirements are difficult to fulfill. All of the known flame-retardant cured epoxy resin materials used in industry therefore comprise up to 20% of bromine in the form of brominated resin components. Considerable amounts of antimony trioxide are often also used as a flame retardant with synergistic effect. The difficulty with these compounds is that although on the one hand they have excellent effectiveness as flame retardants, on the other hand they also have very hazardous properties. For example, antimony trioxide is on the list of chemicals which cause cancer. When aromatic bromine compounds decompose thermally they produce not only bromine radicals and hydrogen bromide, which cause severe corrosion, but when decomposing in the presence of oxygen in particular the highly brominated aromatics can, even more significantly, also form highly toxic polybromodibenzofurans and polybromodibenzodioxins. Considerable problems are also raised by the disposal of waste and used materials containing bromine.

For these reasons there has been no lack of attempts to replace the bromine-containing flame retardants by less problematic substances. Examples of those which have been proposed are fillers with extinguishing gas action, such as alumina hydrates (see: J. Fire and Flammability, Vol. 3 (1972), pages 51 ff.), basic aluminum carbonates (see: Plast. Engng., Vol. 32 (1976), pages 41 ff.) and magnesium hydroxides (EP-A 0 243 201), and also glass-forming fillers, such as borates (see: Modern Plastics, Vol. 47 (1970), No. 6, pages 140 ff.) and phosphates (U.S. Pat. Nos. 2,766,139 and 3,398,019). However, the disadvantage attaching to all of these fillers is that they considerably impair some of the mechanical and chemical properties of the composites. Organic phosphorus compounds, such as phosphoric esters, phosphonic esters and phosphines, have also been proposed as flame-retardant additives (see: W. C. Kuryla and A. J. Papa, Flame Retardancy of Polymeric Materials, Vol. 1, pages 24 to 38 and 52 to 61, Marcel Dekker Inc., New York, 1973).

Epoxy resins may also be made flame-retardant by using reactive organic phosphorus compounds, such as epoxide-group-containing phosphorus compounds, which can be anchored in the epoxy resin network. European Patent 0 384 940 discloses epoxy resin mixtures for use in printed circuit board materials which comprise a phosphorus-free polyepoxy resin in combination with an epoxide-group-containing phosphorus compound of the structure

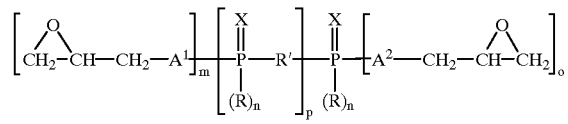

and with a specific aromatic polyamine (in the form of an isocyanuric acid derivative) as hardener. DE-A 43 08 184 and DE-A 43 08 187 and, respectively, the corresponding publications WO 94/21706 and WO 94/21703 disclose epoxy resin mixtures which comprise a phosphorus-modified epoxy resin (epoxide value: from 0.02 to 1 mol/100 g) in combination with the polyamine mentioned. The phosphorus-modified epoxy resins here have been built up from structural units which derive on the one hand from polyepoxy compounds (having at least two epoxide groups per molecule) and on the other hand from phosphinic, phosphonic and pyrophosphonic acids or from phosphonic monoesters and, respectively, from phosphinic anhydrides and phosphonic anhydrides. Other epoxy resin mixtures which comprise phosphorus-modified epoxy resins and aromatic amines as hardener are known from the publications WO 96/07684, WO 96/07685 and WO 96/07686. All of these epoxy resin mixtures are preferably processed from a solution; in bulk they are solid or highly viscous.

There has also been no lack of attempts to develop casting resins based on the phosphorus components mentioned. For example, there are known epoxy casting resins which can be cured by anhydride and comprise phosphonic anhydride as hardener or are obtained by modifying epoxy resin components or hardener components with phosphorus compounds (see in this connection: DE-C 42 37 132, DE-A 195 06 010, WO 96/07678 and WO 96/23018). These casting resins are predominantly highly viscous and, without solvent, cannot be processed below temperatures of >60° C.; temperatures of >80° C. are required for their curing. Low-viscosity epoxy resins which cure using amines at room temperature and are flame-retardant after curing are not yet known.

SUMMARY OF THE INVENTION

It is an object of the invention to provide epoxy resin mixtures whose viscosity at room temperature is sufficiently low that they can be processed by injection molding technology. These resin mixtures are intended on the one hand to retain their low viscosity and processability for a very long period (from about 30 to 60 min) for the injection process and for the filling of large-surface-area molds, but on the other hand to be sufficiently reactive to cure at room temperature within a few hours after filling of the mold, and to be capable of release from the mold and, after postcuring at temperatures of from 100 to 120° C., to have a glass transition temperature $T_G \geq 80°$ C. The resultant cured epoxy resin materials are intended to have good mechanical properties (modulus of elasticity $\geq 18$ GPa) and very low water absorption ($\leq 6\%$). In addition, they are intended to meet the highest requirement in each case when exposed to flame as required by various combustion tests, for example in the DIN 5510-2 combustion test, after exposure to flame for 3 min, to become extinguished within 10 s, have a fire-damaged area of $\leq 20$ cm in diameter, not form droplets and generate very small amounts of smoke gases. For aircraft construction, the US FAR (Federal Aviation Regulations) Specifications Part 23 and Part 25 have to be complied with, for example.

According to the invention, this is achieved in that the epoxy resin mixtures comprise the following components:
(A) a phosphorus-free aliphatic and/or aromatic and/or heterocyclic epoxy resin;
(B) an epoxide group-containing phosphorus compound of the following structure:

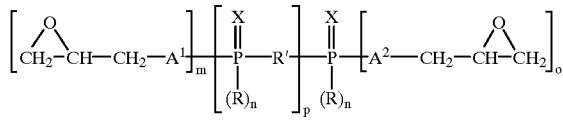

where m=0 or 1, n=0, 1 or 2 and o=1, 2 or 3, and where m+n+o=3,
X is an oxygen or sulfur atom, bonded in each case via a double bond,
R is, bonded directly or via O or S, an alkyl radical having from 1 to 4 carbon atoms, an alkenyl radical having 2 or 3 carbon atoms, a phenyl radical, an aralkyl radical, such as benzyl, or a 3-trialkylsilylpropyl radical,
$A^1$ and $A^2$, which may be identical or different, are a single bond or a bridge composed of O, S, $(CH_2)_r$, $O(CH_2)_r$ or $O(CH_2)_r$—O, where r=from 1 to 3;

(C) a phosphorus-modified epoxy resin with an epoxide value of from 0.02 to 1 mol/100 g, obtained by reacting polyepoxy compounds having at least two epoxide groups per molecule with phosphinic anhydrides and/or phosphonic anhydrides or with phosphonic monoesters, followed by thermal elimination of alcohol; and
(D) as hardener, at least one primary or secondary aliphatic polyamine with NH and/or $NH_2$ groups.

DETAILED DESCRIPTION OF THE INVENTION

Specifically and surprisingly, it has been found that mixtures of the components (A), (B), (C) and (D) fulfil all of the requirements of the object of the invention. The components can be mixed in such a way that the resultant formulations have sufficiently low viscosity and therefore can be processed at room temperature. The formulations themselves are sufficiently reactive and cure within hours at room temperature. The cured resins obtained have good mechanical properties and low water absorption, and also sufficient flame retardancy.

This finding is surprising and completely unexpected, specifically since although on the one hand the mixtures given by component (A) together with components (B) and (D) have low viscosity and process and cure well, the cured resins obtained after curing are not sufficiently flame-retardant. On the other hand, the mixtures obtained from components (A), (C) and (D) have very high viscosity and are beyond the range which can be processed with the aid of injection technology. After curing, these mixtures give cured resins which do not have sufficiently good material properties and in particular also have excessive water absorption and insufficient flame retardancy.

The following compounds are particularly suitable as epoxy resin (component A): aromatic polyglycidyl ethers, such as bisphenol A diglycidyl ether, bisphenol F diglycidyl ether and bisphenol S diglycidyl ether, polyglycidyl ethers of phenol-formaldehyde resins and of cresol-formaldehyde resins, resorcinol diglycidyl ethers and tetrakis(p-glycidylphenyl)ethane, di- and polyglycidyl esters of phthalic, isophthalic and terephthalic acid, and also of trimellitic acid, N-glycidyl compounds of aromatic amines and of heterocyclic nitrogen bases, for example N,N-diglycidylaniline, N,N,O-triglycidyl-p-aminophenol, triglycidyl isocyanurate and N,N,N',N'-tetraglycidyl-bis(p-aminophenyl)methane, hydantoin-epoxy resins and uracil-epoxy resins, and also di- and polyglycidyl compounds of polyhydric aliphatic alcohols, such as 1,4-butanediol, hexanediol and trimethylolpropane, and of polyalkylene glycols. Other compounds suitable as component (A) are cycloaliphatic epoxy resins, such as vinylcyclohexene dioxide. The novel epoxy resin mixtures may comprise the polyepoxy resins individually or in a mixture.

Component (B), too, may be used either in the form of individual compounds or else in the form of a mixture of more than one compound. Examples of suitable components (B) are the following epoxide-group-containing phosphorus compounds, all of which are already known: glycidyl ethylmethylphosphinate, glycidyl dimethylphosphinate and glycidyl diethylphosphinate; diglycidyl methylphosphonate, diglycidyl ethylphosphonate, diglycidyl propylphosphonate, diglycidyl butylphosphonate, diglycidyl vinylphosphonate, diglycidyl phenylphosphonate and diglycidyl biphenylphosphonate; methyl diglycidyl phosphate, ethyl diglycidyl phosphate, n-propyl diglycidyl phosphate, n-butyl diglycidyl phosphate, isobutyl diglycidyl phosphate, allyloxy diglycidyl phosphate, phenyl diglycidyl phosphate, p-methoxyphenyl diglycidyl phosphate, p-ethoxyphenyl diglycidyl phosphate, p-propyloxyphenyl diglycidyl phosphate, p-isopropyloxyphenyl diglycidyl phosphate, phenylthio diglycidyl phosphate, triglycidyl phosphate, tris(glycidylethyl) phosphate, p-glycidylphenyl ethyl glycidyl phosphate and benzyl diglycidyl thiophosphate.

The synthesis of these compounds is carried out, for example, by reacting phosphinic acid chlorides, phosphonic acid chlorides or phosphoric acid chlorides with glycidol (see: Zh. Obshch. Khim., Vol. 54, No. 10 (1984), pages 2404 ff.), by reacting phosphoric acid or phosphonic acids with epichlorohydrin (JP-A 51-143620) or by epoxidizing phosphorus compounds which contain radicals with olefinic double bonds (U.S. Pat. No. 2,856,369).

The phosphorus-modified epoxy resins (component C) are prepared by reacting commercially available polyepoxy resins (polyglycidyl resins or cycloaliphatic polyepoxy compounds) with the following phosphorus compounds:

phosphinic anhydrides: anhydrides of phosphinic acids having alkyl, alkenyl, cycloalkyl, aryl or aralkyl radicals;

bisphosphinic anhydrides: anhydrides of bisphosphinic acids, in particular of alkanebisphosphinic acids with from 1 to 10 carbon atoms in the alkane group;

phosphonic anhydrides: anhydrides of phosphonic acids having alkyl, alkenyl, cycloalkyl, aryl or aralkyl radicals.

Phosphorus-modified epoxy resins of the abovementioned type, and also a process for their preparation, are known from DE-A 43 08 185 or the corresponding publication WO 94/21704.

Phosphorus-modified epoxy resins may also be prepared by reacting the polyepoxy compounds with phosphonic mono-esters instead of phosphonic an- hydrides, and eliminating alcohol at temperatures of at least 80° C. from the resultant products (WO 94/21704).

To prepare the phosphorus-modified epoxy resins, use may be made in general either of aliphatic or aromatic epoxy compounds, or also of mixtures of these. Preference is given to the use of bisphenol A diglycidyl ether, bisphenol F diglycidyl ether, polyglycidyl ethers of phenol-formaldehyde novolaks and of cresol-formaldehyde novolaks, and also to diglycidyl ethers of butanediol, of hexanediol or of polyether glycols, and to butadiene dioxide, diglycidyl ether, vinylcyclohexene dioxide and other cycloaliphatic diepoxides, and also to mixtures made from these epoxy resins. Examples of other polyepoxides which may be used are hydrogenated bisphenol A diglycidyl ether, hydrogenated bisphenol F diglycidyl ether, hydantoin epoxy resins, triglycidyl isocyanurate, triglycidyl-p-aminophenol, tetraglycidyldiaminodiphenylmethane, tetraglycidyldiaminodiphenyl ether, tetrakis(4-glycidoxyphenyl)ethane, uracil epoxy resins and epoxides which are described in the Handbook of Epoxy Resins by Henry Lee and Kris Neville, McGraw-Hill Book Company 1967, and in the monograph Epoxy Resins by Henry Lee, American Chemical Society, 1970. The average molecular weight of the polyepoxy compounds is generally from 86 to 1000, preferably from 100 to 500.

The ratio of components A, B and C to one another is selected in such a way that with a phosphorus content of from 1 to 6% weight, based on the resin mixture (components A, B, C and D), preferably of from 2 to 4.5% weight, mixtures of very low viscosity (<500 mPa.s) are obtained. The ratio of component B to component C is preferably from 1:10 to 10:1.

Amine hardeners (component D) used are the known aliphatic polyamines, such as isophoronediamine, triethylenetetraamine, diethylenetriamine, aminoethylpiperazine and others, alone or in a mixture. Other hardeners of this type are: ethylenediamine, 1,2- and 1,3-diaminopropane, 2,2-dimethylpropylenediamine, 1,4-diaminobutane, 1,6-diaminohexane, 1,7-diaminoheptane, 1,8-diaminooctane, 1,9-diaminononane, 1,12-diaminododecane, 4-azaheptamethylenediamine, N,N'-bis(3-aminopropyl)butane-1,4-diamine and cyclohexanediamine.

The novel epoxy resin mixtures may, if desired, comprise conventional additives as additional component (E). The additives are generally flexibilizers, processing aids, such as antifoams and dispersing agents, or also fillers, dyes, coupling agents and mold-release agents. Fillers used here are amorphous and/or crystalline, finely divided (particle size $\leq 10$ $\mu$m) organic or inorganic materials whose particles have very little difference between their length, width and thickness and which permit processing of the resin mixture by the injection process—even when reinforcing materials are present.

The ratio of the epoxy function used (components A, B and C) to the amine hydrogen function NH used (component D) in the novel epoxy resin mixtures may be from 0.9:1 to 1.5:1, advantageously from 0.9:1 to 1.1:1 and preferably about 1:1.

The invention will be described in still further detail in the working examples.

EXAMPLES 1 TO 10

Preparation of the Epoxy Resin Mixtures

The amounts given in Table 1 of components A, B and C are mixed; if desired, component E is added as another constituent of the mixture. After careful degassing, the amount listed in Table 1 of a previously degassed amine hardener (component D) is added to the mixture, and the mixture is homogenized and degassed again. Table 1 gives the data on the mixing proportions and the phosphorus content of each of the mixtures.

| | |
|---|---|
| EPN | epoxyphenol novolak |
| BADGE | bisphenol A diglycidyl ether |
| BuDGE | butanediol diglycidyl ether |
| VCHDO | vinylcyclohexene dioxide |
| HxDGE | hexanediol diglycidyl ether |
| POPTGE | polyoxypropylene triglycidyl ether |
| PPDGE | diglycidyl phenylphosphonate |
| PrPDGE | diglycidyl propylphosphonate |
| MPDGE | diglycidyl methylphosphonate |
| BuDGE-PrPSA | adduct made from butanediol diglycidyl ether and propylphosphonic anhydride |
| IPD | isophoronediamine |
| DETA | diethylenetriamine |
| NAEP | N-aminoethylpiperazine |

Preparation of Test Sheets

The molded test specimens are produced using a sheet mold. The sheet mold is composed of a backplate made from stainless steel, a stainless steel frame (spacer) of internal dimensions 500×190 mm and thickness 5.4 mm and a top plate made from acrylic sheet of thickness 25 mm. Using the spacer, the top plate and backplate can be bolted together so as to be vacuum-tight. In each case the sheet mold can be evacuated via a hose connector and can be filled with the reaction resin mixture. 12 layers of woven glass fabric (390 g/m$^2$, 0.45 mm) and 1 layer of nonwoven glass fabric are laid into the sheet mold. The sheet mold is then sealed and evacuated. Immediately after the degassing, the prepared epoxy resin mixture is introduced into the evacuated sheet mold via a silicone tube. The glass-fabric-reinforced epoxy resin mixture cures at room temperature in about 16 h and can be removed from the mold. The released test specimen is postcured for 6 h at 100° C.

Production of Test Tubes

Two acrylic pipes (external diameter: 80 and 100 mm, respectively, wall thickness: 3 mm in each case, length: 2 m in each case) are placed concentrically one inside the other. 6 layers of glass fabric are placed in the space between the pipes. The end faces of the pipes have been sealed so as to be vacuum-tight and each has a hose connector permitting, respectively, evacuation and filling. A degassed epoxy resin mixture as in Example 9, for example, is introduced via a silicone tube into the evacuated space between the concentric acrylic pipes. The glass-fabric-reinforced epoxy resin mixture cures at room temperature in about 16 h and can be removed from the mold. The released test specimen is postcured for 6 h at 100°%0 C. The ash from samples taken at the filling nozzle and at the vacuum connection amounts to 10.05 and 9.75%, respectively.

The following tests are carried out to evaluate properties in processing and those of the cured resin:

Viscosity and Pot Life

The viscosity of the amine-curable epoxy resin mixture in its initial condition, and the pot life on cold curing, are determined with a plate and cone rheometer (Haake Rotovisko PK 1 0.3) at 25° C. The pot life is the time to reach a viscosity of 1000 mPa.s.

Curing

All of the samples are cured in the mold for 16 h at room temperature. The released samples are postcured for 6 h at 100° C.

Glass Transition Temperature

The glass transition temperature is determined via thermal expansion. In a dilatometer (Perkin Elmer TMA 7) a test specimen (dimensions: 5×5×5.4 mm) is heated to 120° C. for conditioning and cooled to −25° C. at a cooling rate of 5 K/min. The test specimen is then heated to 200° C. at a heating rate of 5 K/min; in parallel with this, thermal expansion is measured. The glass transition temperature is given as the temperature range in which the coefficient of expansion changes abruptly.

Modulus of Elasticity

The modulus of elasticity is determined in accordance with DIN 53455 on dumbbell specimens of 2.5 mm thickness with 6 layers of woven glass fabric in a tensile test apparatus (Zwick UPM 1435) at room temperature.

Interlaminar Adhesion

Interlaminar adhesion is determined on test specimens (dimensions: 120×12×5.4 mm) with 12 layers of woven glass fabric in accordance with DIN 53539-79.

Water Absorption

To determine water absorption, test specimens of edge length 50×50×5.4 mm are stored at 20° C. for 24 h in demineralized water, followed by gravimetric determination of the weight increase.

Fire Performance

Fire performance is tested in accordance with DIN 5510-2. For each test a test sheet (dimensions: 500×190×5.4 mm) with 12 layers of woven glass fabric is fastened in a fire duct in accordance with DIN 4102 Part 15, and a propane gas flame is applied to it for 3 min. For S4 classification, the average of 10 afterburn times must not exceed 10 s and the maximum diameter of the damaged area must not exceed 20 cm. For S3 classification, afterburn times of up to 100 s and a dimension of 25 cm for the damaged area are permissible. During the experiment, smoke generation is measured in the exhaust gas tube. For SR 2 classification, the integral over the duration of the experiment must not reach 50% light attenuation. For SR 1 classification, light attenuation of<100% is required.

The values determined for processing performance, thermomechanical properties and fire performance are given in Table 2.

EXAMPLES 11 AND 12

These are comparative examples. The preparation of the epoxy resin mixtures, the production of test specimens and the testing to assess properties in processing and of the cured resin are as in Examples 1 to 10. Table 3 gives the composition of the epoxy resin mixtures and the phosphorus content, and Table 4 shows the results of studies of processing performance, thermomechanical properties and fire performance.

The comparative examples show (see in this connection Tables 3 and 4) that use of the phosphorus-containing epoxy resin component C alone gives unsatisfactory fire performance. In addition, the viscosity of the epoxy resin mixtures (1500 mPa.s and above) is much too high for use in the RTM process. Alongside the low glass transition temperatures of markedly<100° C., the values for the modulus of elasticity in the tensile test are also too low for mechanical applications. The cured epoxy resin mixtures, furthermore, have extremely high water absorption and low interlaminar adhesion, making them unsuitable for use in composites which can be subjected to mechanical stress.

TABLE 1

| Example | 1 | 2 | 3 | 4 | 5 | 6 | 7 | 8 | 9 | 10 |
|---|---|---|---|---|---|---|---|---|---|---|
| Phosphorus content | 4.50 | 4.50 | 4.00 | 3.50 | 4.50 | 4.75 | 4.80 | 4.50 | 4.00 | 3.30 |
| Component A: | | | | | | | | | | |
| EPN | 24.92 | 15.95 | 37.00 | 42.24 | 16.40 | | 12.93 | | 28.10 | |
| BADGE | | | | | | 18.75 | 10.00 | 9.60 | | 27.00 |
| BuDGE | 15.00 | 15.00 | | 10.00 | 15.00 | | | 17.00 | 20.00 | |
| VCHDO | | | | | | 10.00 | 10.00 | | | |
| HxDGE | | | 5.00 | | | | | 11.00 | | 14.15 |
| POPTGE | | | | | | | | 5.00 | | 5.00 |
| Component B: | | | | | | | | | | |
| PPDGE | 19.57 | 19.57 | 30.45 | | 19.57 | 25.00 | | | 26.10 | |
| PrPDGE | | | | | | | 34.35 | 26.72 | | |

TABLE 1-continued

| Example | 1 | 2 | 3 | 4 | 5 | 6 | 7 | 8 | 9 | 10 |
|---|---|---|---|---|---|---|---|---|---|---|
| MPDGE | | | | 21.48 | | | | | 23.50 | |
| Component C: | | | | | | | | | | |
| BuDGE-PrPSA | 30.00 | 30.00 | 6.67 | 4.00 | 30.00 | 25.00 | 4.00 | 13.33 | 6.67 | 4.00 |
| Component D: | | | | | | | | | | |
| IPD | | 19.48 | 20.88 | | | | 21.25 | 23.72 | 22.35 | |
| DETA | 10.51 | | | | | | | | 11.73 | |
| NAEP | | | | 22.28 | 19.03 | | | | | 18.75 |
| Component E: | | | | | | | | | | |
| Fused silica | | | | | | | | | 10.00 | |
| Chalk | | | | | | | | | | 5.00 |

TABLE 2

| Example | 1 | 2 | 3 | 4 | 5 | 6 | 7 | 8 | 9 | 10 |
|---|---|---|---|---|---|---|---|---|---|---|
| Resin viscosity [mPa · s/25° C.] | 300 | 250 | 180 | 150 | 250 | 150 | 170 | 220 | 380 | 190 |
| Pot life [min] | 120 | 120 | 100 | 140 | 120 | 130 | 85 | 90 | 60 | 130 |
| Curing at RT [h] | 16 | 16 | 16 | 16 | 16 | 16 | 16 | 16 | 16 | 16 |
| Postcuring at 100° C. [h] | 6 | 6 | 6 | 6 | 6 | 6 | 6 | 6 | 6 | 6 |
| Glass transition temperature [° C.] | 108 | 103 | 130 | 135 | 105 | 105 | 118 | 108 | 128 | 108 |
| Modulus of elasticity [N/mm$^2$] | 19500 | 19200 | 20800 | 23000 | 19300 | 19500 | 20000 | 20500 | 20800 | 19700 |
| Interlaminar adhesion [N/mm] | 1.10 | 1.10 | 1.20 | 1.25 | 1.15 | 1.15 | 1.18 | 1.13 | 1.10 | 1.12 |
| Water absorption at RT [%] | 2.80 | 2.80 | 2.55 | 2.20 | 2.35 | 2.20 | 2.45 | 2.80 | 2.60 | 2.35 |
| Fire performance in accordance with DIN 5510-2 | S 4 | S 4 | S 4 | S 4 | S 4 | S 4 | S 4 | S 4 | S 4 | S 4 |
| Afterburn time [s] | 5 | 6 | 8 | 9 | 6 | 3 | 4 | 5 | 1 | 3 |
| Extent of damage [cm] | 15 | 15 | 17 | 18 | 17 | 15 | 14 | 17 | 14 | 16 |
| Integral smoke gas density [%] | 48 | 48 | 45 | 48 | 45 | 48 | 42 | 47 | 38 | 40 |

TABLE 3

| Example | 11 | 12 |
|---|---|---|
| Phosphorus content | 4.50 | 3.50 |
| Component A: | | |
| EPN | 15.40 | 19.00 |
| BADGE | | |
| BuDGE | | |
| VCHDO | 15.00 | 15.00 |
| HxDGE | | |
| POPTGE | | |
| Component B: | | |
| PPDGE | | |
| PrPDGE | | |
| MPDGE | | |
| Component C: | | |
| BuDGE-PrPSA | 60.00 | 47.00 |
| Component D: | | |
| IPD | | 19.00 |
| DETA | 9.63 | |
| NAEP | | |
| Component E: | | |
| Fused silica | | |
| Chalk | | |

TABLE 4

| Example | 11 | 12 |
|---|---|---|
| Resin viscosity [mPa · s/25° C.] | 1800 | 1500 |
| Pot life [min] | 0 | 0 |
| Curing at RT [h] | 16 | 16 |
| Postcuring at 100° C. [h] | 6 | 6 |
| Glass transition temperature [° C.] | 66 | 75 |
| Modulus of elasticity [N/mm$^2$] | 17100 | 18800 |
| Interlaminar adhesion [N/mm] | 0.70 | 0.65 |
| Water absorption at RT [%] | 18.9 | 16.7 |
| Fire performance in accordance with DIN 5510-2 | S 3 | S 3 |
| Afterburn time [s] | 18 | 62 |
| Extent of damage [cm] | 18 | 20 |
| Integral smoke gas density [%] | 88 | 62 |

What is claimed is:

1. An epoxy resin mixture for producing composites, characterized in that it comprises the following components:

(A) a phosphorus-free aliphatic epoxy resin, aromatic epoxy resin and/or heterocyclic epoxy resin;

(B) an epoxide group-containing phosphorus compound of the following structure:

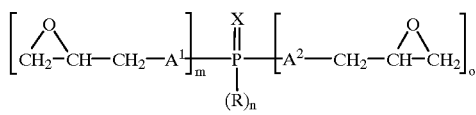

where m=0 or 1, n=0, 1 or 2 and o=1, 2 or 3, and where m+n+o=3,

- X is an oxygen or sulfur atom, bonded in each case via a double bond,
- R is, bonded directly or via O or S, an alkyl radical having from 1 to 4 carbon atoms, an alkenyl radical having 2 or 3 carbon atoms, a phenyl radical, an aralkyl radical, or a 3-trialkylsilylpropyl radical,
- $A^1$ and $A^2$, which may be identical or different, are a single bond or a bridge composed of O, S, $(CH_2)_r$, $O(CH_2)_r$ or $O(CH_2)_r$—, where r=from 1 to 3;

(C) a phosphorus-modified epoxy resin with an epoxide value of from 0.02 to 1 mol/100 g, obtained by reacting polyepoxy compounds having at least two epoxide groups per molecule with phosphinic anhydrides and/or phosphonic anhydrides, or with phosphonic monoesters, followed by thermal elimination of alcohol; and (D) as hardener, at least one primary or secondary aliphatic polyamine with NH and/or $NH_2$ groups.

2. An epoxy resin mixture as claimed in claim 1, further comprising an additive selected from the group consisting of: flexibilizers, processing aids, fillers, dyes, coupling agents and mold-release agents.

3. An epoxy resin mixture as claimed in claim 1 having a phosphorus content, based on the resin mixture, of from 1 to 6% by weight.

4. An epoxy resin mixture as claimed in claim 1 wherein the ratio of epoxide function to amine hydrogen function is from 0.9:1 to 1.5:1.

5. An epoxy resin mixture as claimed in claim 1 wherein the ratio of component B to component C is from 1:10 to 10:1.

6. An epoxy resin mixture as claimed in claim 1 wherein component A is a mixture comprising an aromatic polyglycidyl ether and a polyglycidyl compound of a polyhydric aliphatic alcohol.

7. An epoxy resin mixture as claimed in claim 1 wherein component B is a diglycidyl ester of an alkyl- or arylphosphonic acid.

8. An epoxy resin mixture as claimed in claim 1 wherein component C is a reaction product of an aliphatic epoxide compound with a phosphonic anhydride.

9. An epoxy resin mixture as claimed in claim 1 wherein component D is isophoronediamine, diethylenetriamine, N-amino-ethylpiperazine or a mixture composed of at least two of these polyamines.

10. An epoxy resin mixture as claimed in claim 2 wherein said additive is fused silica.

11. A composite prepared by the injection molding of the epoxy resin mixture of claim 1 into a mold containing nonwoven fibers, woven fibers, sheet materials or foam materials.

12. A material for aircraft, ships, motor vehicles or rail vehicles obtained from the composite of claim 11.

* * * * *